United States Patent
Kim

(10) Patent No.: US 7,616,955 B2
(45) Date of Patent: Nov. 10, 2009

(54) METHOD AND SYSTEM FOR BITS AND CODING ASSIGNMENT UTILIZING EIGEN BEAMFORMING WITH FIXED RATES FOR CLOSED LOOP WLAN

(75) Inventor: Joonsuk Kim, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 636 days.

(21) Appl. No.: 11/052,389

(22) Filed: Feb. 7, 2005

(65) Prior Publication Data

US 2006/0105767 A1    May 18, 2006

Related U.S. Application Data

(60) Provisional application No. 60/627,467, filed on Nov. 12, 2004.

(51) Int. Cl.
  G06F 15/16    (2006.01)
(52) U.S. Cl. .................................... 455/434; 455/41.2
(58) Field of Classification Search .............. 455/67.14, 455/62, 63.3, 134, 138, 139, 423, 557, 434, 455/41.2; 370/248, 346, 468
See application file for complete search history.

(56) References Cited

U.S. PATENT DOCUMENTS

| 5,070,538 A | 12/1991 | Mahany et al. |
| 5,425,051 A | 6/1995 | Mahany |
| 5,940,439 A * | 8/1999 | Kleider et al. ............... 375/225 |
| 2005/0113041 A1 * | 5/2005 | Polley et al. ................. 455/105 |

* cited by examiner

Primary Examiner—Sam Bhattacharya
(74) Attorney, Agent, or Firm—McAndrews, Held & Malloy

(57) ABSTRACT

A method and system for bits and coding assignment utilizing Eigen beamforming with fixed rates for a closed loop WLAN is provided. Aspects of the method for communicating information in a communication system may comprise transmitting data via a plurality of radio frequency (RF) channels utilizing a plurality of transmitting antennas and receiving feedback information related to the plurality of RF channels. Bits may be assigned for transmission via at least one of the plurality of RF channels based on the feedback information. At least a portion of subsequent data having at least a first coding rate based on the assignment of bits may be transmitted via at least one of the plurality of RF channels. The method may also comprise receiving data via a plurality of RF channels utilizing a plurality of receiving antennas, and transmitting feedback information related to the plurality of RF channels.

30 Claims, 8 Drawing Sheets

METHOD AND SYSTEM FOR BITS AND CODING ASSIGNMENT UTILIZING EIGEN BEAMFORMING WITH FIXED RATES FOR CLOSED LOOP WLAN

CROSS-REFERENCE TO RELATED APPLICATIONS/INCORPORATION BY REFERENCE

This application makes reference to, claims priority to, and claims the benefit of U.S. Provisional Application Ser. No. 60/627467 filed on Nov. 12, 2004.

This application also makes reference to U.S. patent application Ser. No. 11/052,353 filed Feb. 7, 2005.

All of the above stated applications are hereby incorporated herein in their entirety.

FIELD OF THE INVENTION

Certain embodiments of the invention relate to wireless networking. More specifically, certain embodiments of the invention relate to a method and system for bits and coding assignment utilizing Eigen beamforming with fixed rates for a closed loop wireless local area network (WLAN).

BACKGROUND OF THE INVENTION

The Institute for Electrical and Electronics Engineers (IEEE), in resolution IEEE 802.11, also referred as "802.11", has defined a plurality of specifications which are related to wireless networking. With current existing 802.11 standards, such as 802.11(a),(b),(g), which can support up to 54 Mbps data rates, either in 2.4 GHz or in 5 GHz frequency bands, the IEEE standards body created a new task group, 802.11n, to support higher than 100 Mbps data rates. Among them are being discussed specifications for "closed loop" feedback mechanisms by which a receiving station may feed back information to a transmitting station to assist the transmitting station in adapting signals, which are sent to the receiving station. In closed loop feedback systems, a transmitting station may utilize feedback information from a receiving station to transmit subsequent signals in what is called "beamforming". Beamforming is a technique to steer signals to a certain direction for the receiver to receive it more reliably with less noise and interference. Compounded with demands for new features and capabilities, various proposals for new 802.11n based feedback mechanisms are emerging to address the demand for these new features and capabilities. For example, there exists a demand for the introduction of new capabilities, which may enable a receiving mobile terminal to feedback pertinent information to a transmitting mobile terminal. This feedback of pertinent information may enable the transmitting mobile terminal to adapt its mode of transmission based upon the feedback information provided by the receiving mobile terminal. As with any communication system, a major goal is to enable the transmitting mobile station to achieve a higher information transfer rate to the receiving mobile terminal, while simultaneously achieving a lower packet error rate (PER). Notwithstanding, there are no existing methodologies that adequately address these shortcomings and the demand for these new features and capabilities in WLANs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for bits and coding assignment utilizing Eigen beamforming with fixed rates for a closed loop WLAN. Aspects of the method for communicating information in a communication system may comprise transmitting data via a plurality of radio frequency (RF) channels utilizing a plurality of transmitting antennas and receiving feedback information related to the plurality of RF channels. Bits may be assigned for transmission via at least one of the plurality of RF channels based on the feedback information, and at least a portion of subsequent data having at least a first coding rate based on the assignment of bits may be transmitted via the at least one of the plurality of RF channels.

The method may further comprise coding at least a portion of the assigned bits utilizing the first coding rate. The first coding rate may be computed based on received feedback information for transmitting at least a portion of the subsequent data. The received feedback information may be based on channel estimation information for at least a portion of the plurality of RF channels and/or signal to noise ratio information for at least a portion of the plurality of RF channels.

In one aspect of the invention, the signal to noise ratio may be computed based on at least one transmitted tone for at least one of the plurality of RF channels. At least a second coding rate may be computed based on the received feedback information for transmitting at least a remaining portion of the subsequent data. At least a portion of the assigned bits may be coded utilizing the second coding rate. The method may further comprise transmitting at least the second coding rate via at least one of the plurality of RF channels. Bits may be reassigned for transmission based on updated received feedback information related to the plurality of RF channels.

In another embodiment of the invention, a method for communicating information in a communication system is provided. The method may comprise receiving data via a plurality of RF channels utilizing a plurality of receiving antennas. Feedback information related to the plurality of RF channels may be transmitted and the transmitted feedback information may be utilized to assign bits for transmission via at least one of the plurality of RF channels. At least a portion of subsequent data having at least a first coding rate may be transmitted based on the assignment of bits via the at least one of the plurality of RF channels.

In one aspect of the invention, at least a portion of the assigned bits may be coded utilizing the first coding rate. The first coding rate may be computed based on the transmitted feedback information for transmitting at least a portion of the subsequent data. The transmitted feedback information may be based on channel estimation information for at least a portion of the plurality of RF channels and/or signal to noise ratio information for at least a portion of the plurality of RF channels.

In one aspect of the invention, the signal to noise ratio may be computed based on at least one transmitted tone for at least one of the plurality of RF channels. At least a second coding rate may be computed based on the transmitted feedback information and utilized for transmitting at least a remaining portion of the subsequent data. At least a portion of the assigned bits may be coded utilizing the second coding rate. The method may further comprise receiving at least the remaining portion of the subsequent data having at least the second coding rate via at least one of the plurality of RF channels. Bits may be reassigned for transmission based on updated transmitted feedback information related to the plurality of RF channels.

Certain aspects of the system for communicating information in a communication system may comprise a transmitter that transmits data via a plurality of RF channels utilizing a plurality of transmitting antenna. The transmitter may be adapted to receive feedback information related to the plurality of RF channels and assign bits for transmission via at least one of the plurality of RF channels based on the feedback information. The transmitter may transmit at least a portion of subsequent data having at least a first coding rate based on the assignment of bits via the at least one of the plurality of RF channels.

The system may further comprise a processor that codes at least a portion of the assigned bits utilizing the first coding rate. The processor may compute the first coding rate in the transmitter based on the received feedback information for transmitting at least a portion of the subsequent data. The received feedback information may be based on channel estimation information for at least a portion of the plurality of RF channels and/or signal to noise ratio information for at least a portion of the plurality of RF channels.

In one aspect of the invention, the signal to noise ratio may be computed based on at least one transmitted tone for at least one of the plurality of RF channels. A processor may compute at least a second coding rate in the transmitter based on the received feedback information, which is utilized for transmitting at least a remaining portion of the subsequent data. The system may further comprise a coding processor that may code at least a portion of the assigned bits utilizing the second coding rate in the transmitter. The transmitter may be adapted to transmit at least the remaining portion of the subsequent data having at least the second coding rate via at least one of the plurality of RF channels. The transmitter may reassign bits for transmission based on updated received feedback information related to the plurality of RF channels.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for bits and coding assignment utilizing Eigen beamforming with fixed rates for a closed loop WLAN. Adaptive antenna and adaptive beamforming may be utilized to address at least some of the problems associated with signal loss of a transmitted signal as it traverses a communication link or medium. Adaptive antenna and adaptive beamforming utilizes various techniques to reduce interference within a communication medium. For example, adaptive antenna and adaptive beamforming may transmit directional signals to a receiving communication device via a narrow beam so as to reduce PER over the transmission medium. The reduced PER may result in much higher data rates and increased system capacity.

In accordance with an embodiment of the invention, utilizing singular value decomposition (SVD), Eigen beamforming may be applied to provide greater spatial spectrum efficiency. Diagonalized singular values (D) may be utilized to provide better space mode with better signal quality. Furthermore, by assigning more bits on better space mode, the probability of information loss in transmitted signals may be reduced.

Figure 1A:
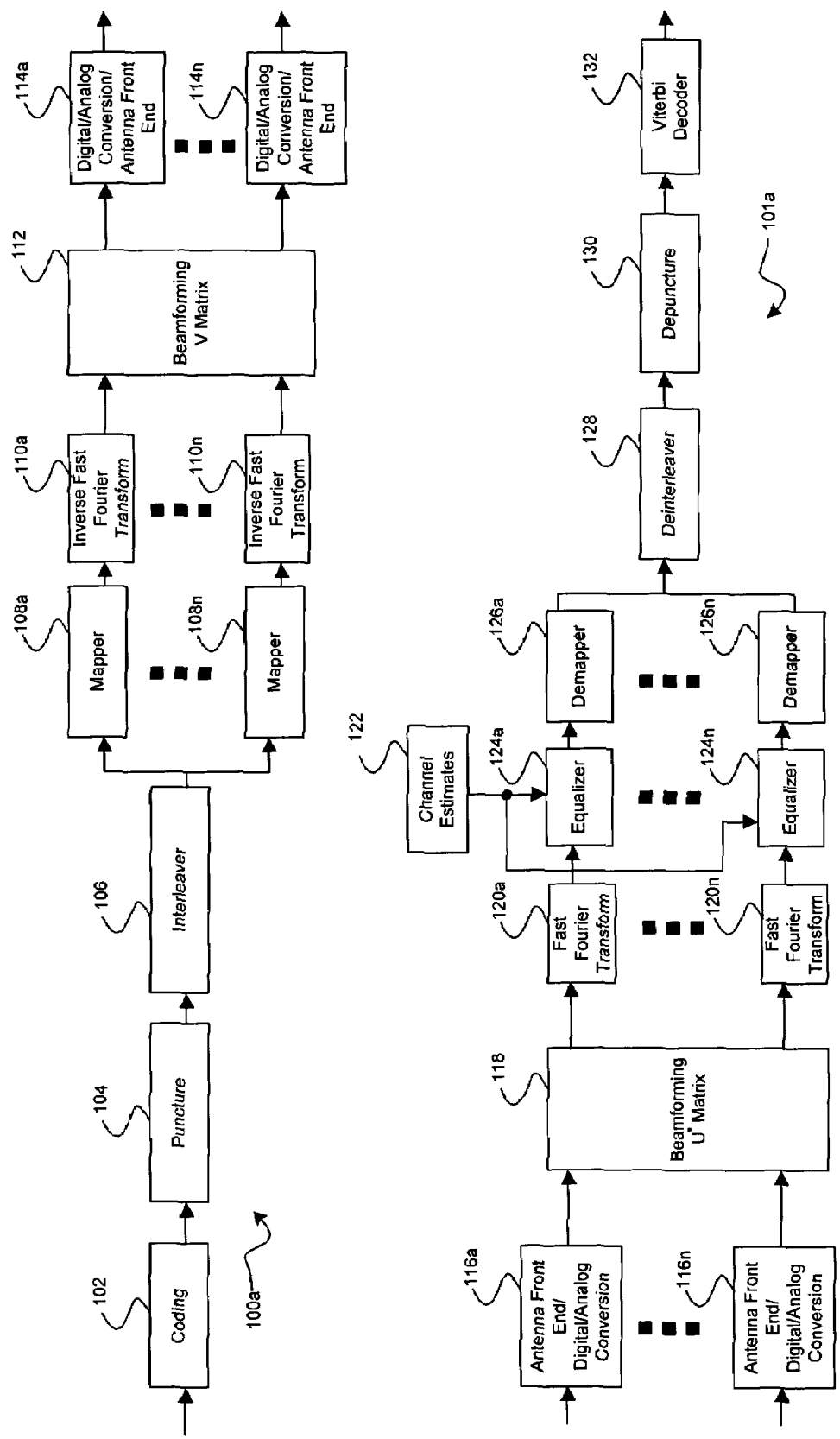
FIG. 1a is an exemplary block diagram of a transmitter and a receiver in a MIMO system, in accordance with an embodiment of the invention.

FIG. 1a is an exemplary block diagram of a transmitter and a receiver in a MIMO system, in accordance with an embodiment of the invention. With reference to FIG. 1 is shown a transmitter 100a and a receiver 101a. The transmitter 100a may comprise a coding block 102, a puncture block 104, an interleaver block 106, a plurality of mapper blocks 108a ... 108n, a plurality of inverse fast Fourier transform (IFFT) blocks 110a ... 110n, a beamforming V matrix block 112, and a plurality of digital/analog (D/A) conversion/antenna front end blocks 114a ... 114n. The receiver 101a may comprise a plurality of antenna front end/analog/digital (A/D) conversion blocks 116a ... 116n, a beamforming U* matrix block 118, a plurality of fast Fourier transform (FFT) blocks 120a ... 120n, a channel estimates block 122, a plurality of equalizer blocks 124a ... 124n, a plurality of demapper blocks 126a ... 126n, a deinterleaver block 128, a depuncture block 130, and a Viterbi decoder block 132.

In the transmitter 100a, the coding block 102 may transform received binary input data blocks by applying a forward error correction (FEC) technique such as, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notion $i_b/t_b$, where $t_b$ represents the total number of bits which comprise a coding group of bits, while $i_b$ represents the number of information bits that are contained in the group of bits $t_b$. Any number of bits $t_b$-$i_b$ may represent redundant bits which may enable the receiver 101a to detect and correct errors introduced during transmission. Increasing the number of redundant bits may enable greater capabilities at the receiver to detect and correct errors in information bits. The penalty for this additional error detection and correction capability may result in a reduction in the information transfer rates between the transmitter 100*a* and the receiver 101*a*.

The puncture block 104 may receive transformed binary input data blocks from the coding block 102 and alter the coding rate by removing redundant bits from the received transformed binary input data blocks For example, if the coding block 102 implemented a ½ coding rate, 4 bits of data received from the coding block 102 may comprise 2 information bits, and 2 redundant bits. By eliminating 1 of the redundant bits in the group of 4 bits, the puncture block 104 may adapt the coding rate from ½ to ⅔. The interleaver block 106 may rearrange bits received in a coding rate-adapted data block from the puncture block 104 prior to transmission via an RF channel to reduce the probability of uncorrectable corruption of data due to burst of errors, impacting contiguous bits, during transmission via an RF channel. The output from the interleaver block 106 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 106, $n_{st}$, and a given number of bits assigned to an individual stream i by the interleaver block 106, $b_{st}(i)$:

$$b_{db} = \sum_{i=1}^{n_{st}} b_{st}(i) \quad \text{equation [1]}$$

The plurality of mapper blocks 108*a* . . . 108*n* may comprise a number of individual mapper blocks which is equal to the number of individual streams generated by the interleaver block 106. Each individual mapper block 108*a* . . . 108*n* may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 108*a* . . . 108*n* for stream i may utilize a modulation technique to map a plurality of bits, $b_{st}(i)$, into a symbol.

The plurality of IFFT blocks 110*a* . . . 110*n* may receive symbols from the plurality of mapper blocks 108*a* . . . 108*n* where each IFFT block, such as 110*a*, may receive a symbol from a corresponding mapper block, such as 108*a*. Each IFFT block 110*a* . . . 110*n* may subdivide the bandwidth of the RF channel into a plurality of n sub-band frequencies to implement orthogonal frequency division multiplexing (OFDM), buffering a plurality of received symbols equal to the number of sub-bands. Each buffered symbol may be modulated by a carrier signal whose frequency is based on that of one of the sub-bands. Each of the IFFT blocks 110*a* . . . 110*n* may then independently sum their respective buffered and modulated symbols across the frequency sub-bands to perform an n-point IFFT thereby generating a composite OFDM signal.

The beamforming V matrix block 112 may apply the beamforming technique to the plurality of composite OFDM signals, or "spatial modes", generated from the plurality of IFFT blocks 110*a* . . . 110*n*. The beamforming V matrix block 112 may generate a plurality of signals where the number of signals generated may be equal to the number of transmitting antenna at the transmitter 100*a*. Each signal in the plurality generated by the beamforming V block 112 may comprise a weighted sum of at least one of the received composite OFDM signals from the IFFT blocks 110*a* . . . 110*n*. The plurality of D/A conversion/antenna front end blocks 114*a* . . . 114*n* may receive the plurality of signals generated by the beamforming V matrix block 112, converting the digital signal representation received from the beamforming V matrix block 112 to an analog RF signal which may be amplified and transmitted via an antenna. The plurality of D/A conversion/antenna front end blocks 114*a* . . . 114*n* may equal the number of transmitting antenna at the transmitter 100*a*. Each D/A conversion/antenna front end block 114*a* . . . 114*n* may receive one of the plurality of signals from the beamforming V matrix block 112 and may utilize an antenna to transmit one RF signal via an RF channel.

In the receiver 101*a*, the plurality antenna front end/A/D conversion blocks 116*a* . . . 116*n* may receive analog RF signals via an antenna, converting the RF signal to baseband and generating a digital equivalent of the received analog baseband signal. The digital representation may be a complex quantity comprising I and Q components. The number of antenna front end/A/D conversion blocks 116*a* . . . 116*n* may be equal to the number of receiving antenna at the receiver 101*a*. The beamforming U* block 118 may apply the beamforming technique to the plurality of digital signals received from the plurality of antenna front end/A/D conversion blocks 116*a* . . . 116*n*. The beamforming U* block 118 may generate a plurality of signals where the number of signals generated may be equal to the number of streams utilized in generating the signals at the transmitter 100*a*. Each signal in the plurality generated by the beamforming U* block 118 may comprise a weighted sum of at least one of the digital signals received from the antenna front end/A/D conversion blocks 116*a* . . . 116*n*. The plurality of FFT blocks 120*a* . . . 120*n* may receive a plurality of signals from the beamforming U* block 118. The plurality of FFT blocks 120*a* . . . 120*n* may be equal to the number of signals generated by the beamforming U* block 118. Each FFT block 120*a* . . . 120*n* may receive a signal from the beamforming U* block 118, independently applying an n-point FFT technique, demodulating the signal by a plurality of carrier signals based on the n sub-band frequencies utilized in the transmitter 100*a*. The demodulated signals may be mathematically integrated over one sub band frequency period by each of the plurality of FFT blocks 120*a* . . . 120*n* to extract the n symbols from contained in each of the plurality of OFDM signals received by the receiver 101*a*.

The channel estimates block 122 may utilize preamble information contained in the received RF signal to compute channel estimates. The plurality of equalizer blocks 124*a* . . . 124*n* may receive symbols generated by the plurality of FFT blocks 120*a* . . . 120*n*. The plurality of equalizer blocks 124*a* . . . 124*n* may be equal to the number of FFT blocks 120*a* . . . 120*n*. Each of the equalizer blocks 124*a* . . . 124*n* may receive a signal from one of the FFT blocks 120*a* . . . 120*n*, independently processing the signal based on input from the channel estimates block 122 to recover the symbol originally generated by the transmitter 100*a*. Each equalizer block 124*a* . . . 124*n* may comprise suitable logic, circuitry, and/or code that may be adapted to transform symbols received from an FFT block 120*a* . . . 120*n* to compensate for fading in the RF channel. The plurality of demapper blocks 126*a* . . . 126*n* may receive symbols from the plurality of equalizer blocks 124*a* . . . 124*n*, reverse mapping each symbol to a plurality of bits by applying a demodulation technique, based on the modulation technique utilized in generating the symbol at the transmitter 100, to transform the symbol into a plurality of bits. The plurality of demapper blocks 126a . . . 126n may be equal to the number of equalizer blocks 124a . . . 124n, which may also be equal to the number of streams in the transmitter 100a.

The deinterleaver block 128 may receive a plurality of bits from each of the demapper blocks 126a . . . 126n, rearranging the order of bits among the received plurality of bits. The deinterleaver block 128 may rearrange the order of bits from the plurality of demapper blocks 126a . . . 126n in, for example, the reverse order of that utilized by the interleaver 106 in the transmitter 100. The depuncture block 130 may insert "null" bits into the output data block received from the deinterleaver block 128 that were removed by the puncture block 104. The Viterbi decoder block 132 may decode a depunctured output data block, applying a decoding technique which may recover the binary data blocks that were input to the coding block 102.

Figure 1B:
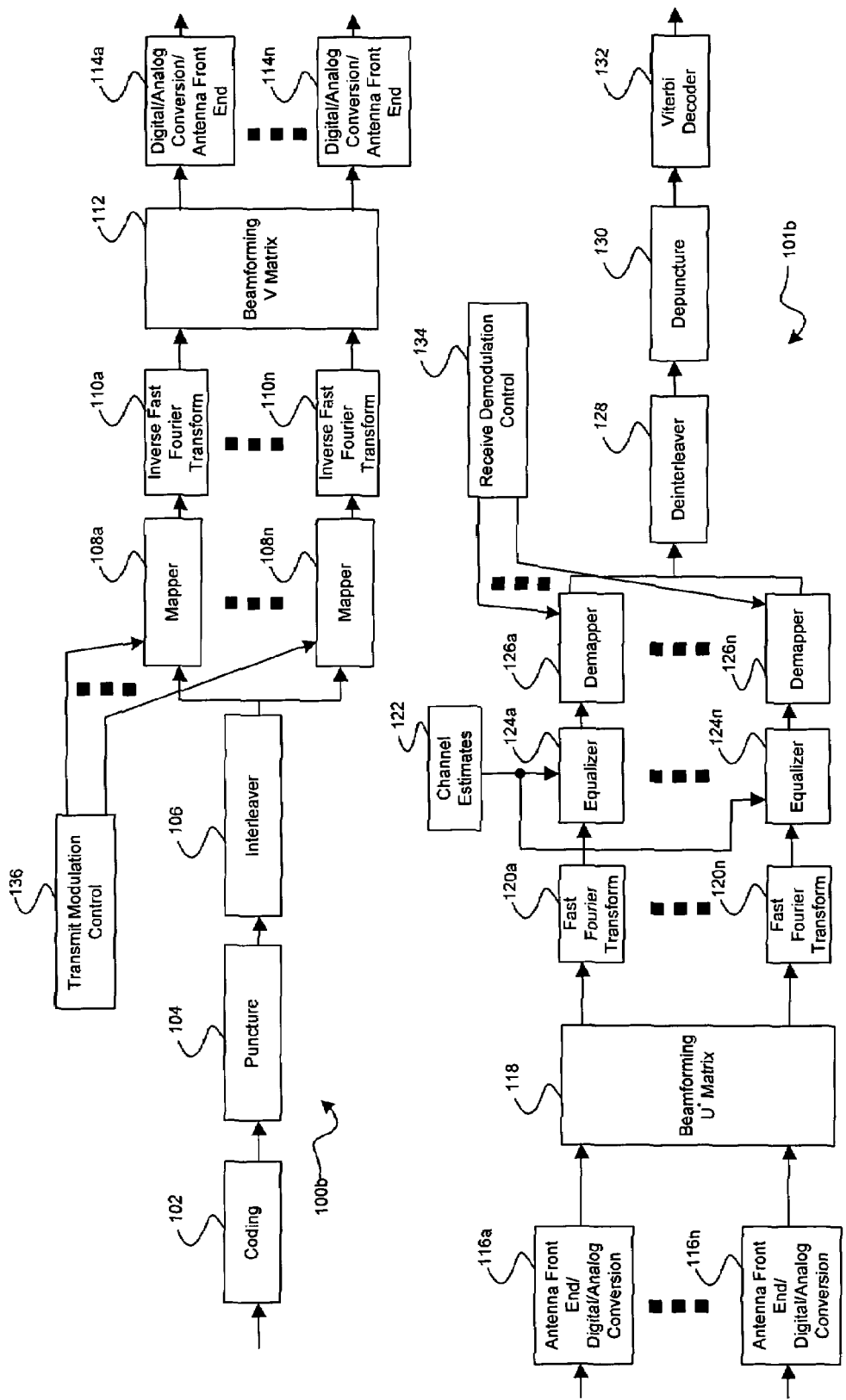
FIG. 1b is an exemplary block diagram of a transmitter with adaptive modulation and a corresponding receiver with adaptive demodulation for a MIMO system, in accordance with an embodiment of the invention.

FIG. 1b is an exemplary block diagram of a transmitter with adaptive modulation and a corresponding receiver with adaptive demodulation for a MIMO system, in accordance with an embodiment of the invention. With reference to FIG. 1b is shown a transmitter 100b, and a receiver 101b. The transmitter 100b may comprise a transmit modulation control block 136, and a plurality of blocks as shown in the transmitter 100a (FIG. 1a). The receiver 101b may comprise a receive demodulation control block 134, and a plurality of blocks as shown in the receiver 101a (FIG. 1a). The transmit modulation control block 136 may enable control over the selection of modulation techniques utilized in the transmitter 100b. The receive demodulation control block 134 may enable control over the selection of demodulation techniques utilized in the receiver 101b. In operation, the transmit modulation control block 136 may enable control of modulation techniques applied by each of the plurality of mapper blocks 108a . . . 108n individually, on a per-stream basis. The receive demodulation control block 134 may enable control of demodulation techniques applied by each of the plurality of demapper blocks 126a . . . 126n individually, on a per-stream basis.

In operation, per-stream control of the mapper blocks 108a . . . 108n may control the number of bits assigned to one or more individual streams, $b_{st}(i)$, to ensure that the sum of bits across the plurality of streams equals the aggregate number of bits in the coding rate-adapted data block, $b_{db}$, as shown in equation[1].

Figure 1C:
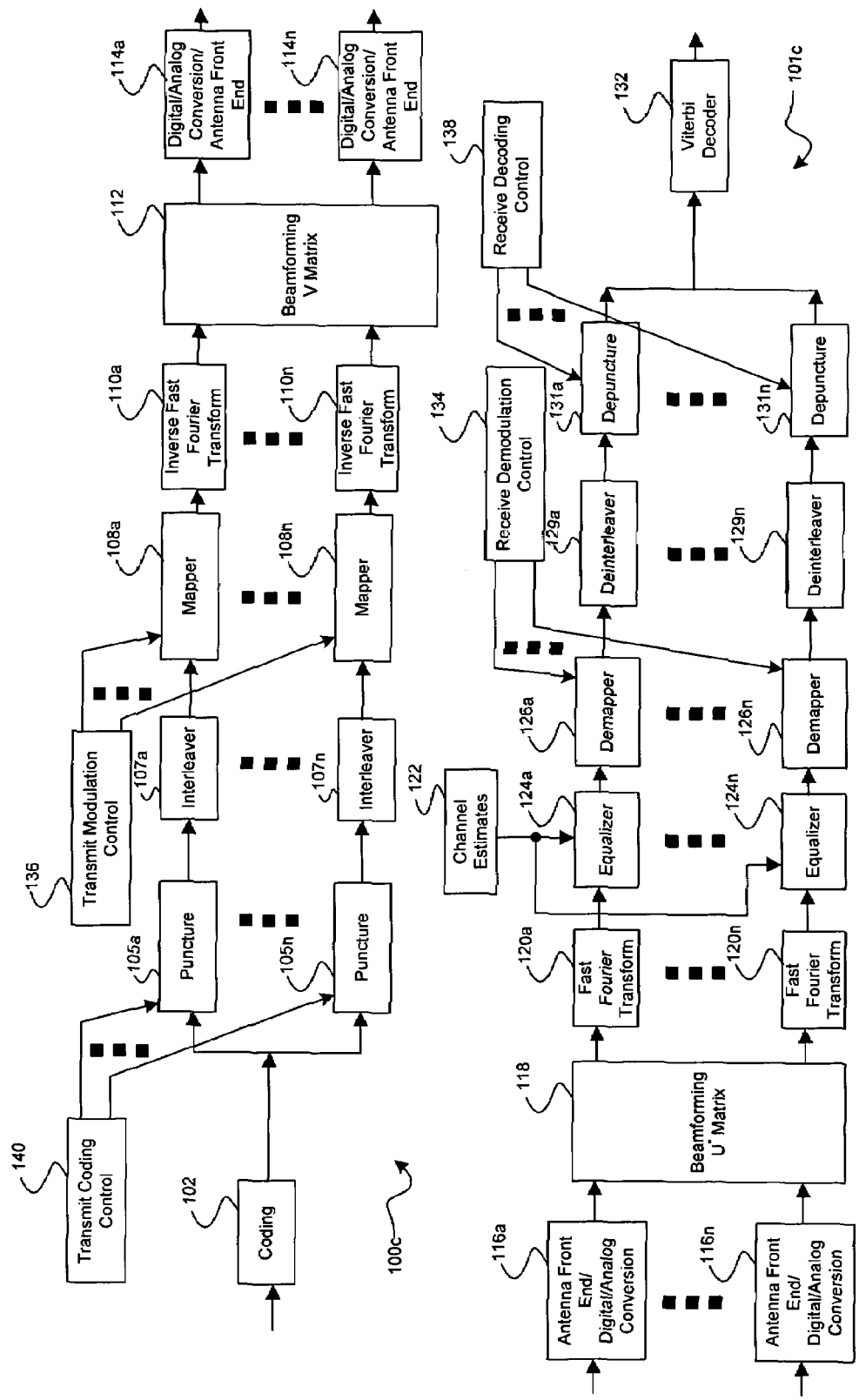
FIG. 1c is an exemplary block diagram of a transmitter with adaptive modulation and coding, and a corresponding receiver with adaptive demodulation and decoding for a MIMO system, in accordance with an embodiment of the invention.

FIG. 1c is an exemplary block diagram of a transmitter with adaptive modulation and coding, and a corresponding receiver with adaptive demodulation and decoding for a MIMO system, in accordance with an embodiment of the invention. With reference to FIG. 1c is shown a transmitter 100c, and a receiver 101c. The transmitter 100c may comprise a plurality of puncture blocks 105a . . . 105n, a plurality of interleaver blocks 107a . . . 107n, a transmit coding control block 140, and a plurality of blocks as shown in the transmitter 100b (FIG. 1b). The receiver 101c may comprise a plurality of deinterleaver blocks 129a . . . 129n, a plurality of depuncture blocks 131a . . . 131n, a receive coding control block 138, and a plurality of blocks as shown in the receiver 101b (FIG. 1b).

In the transmitter 100c, puncture and interleaving may be performed individually on a per-stream basis. The output from the plurality of puncture blocks 105a . . . 105n may be communicated to the plurality of interleaver blocks 107a . . . 107n. Each puncture block in the plurality 105a . . . 105n may communicate its output to a corresponding one of the plurality of interleaver blocks 107a . . . 107n. The output from the plurality of interleaver blocks 107a . . . 107n may be communicated to the plurality of mapper blocks 108a . . . 108n. Each interleaver block in the plurality 107a . . . 107n may communicate its output to a corresponding one of the plurality of mapper blocks 108a . . . 108n. The transmit coding control block 140 may enable control over the application of puncture utilized in the transmitter 100c.

In the receiver 101c, depuncture and deinterleaving may be performed individually on a per-stream basis. Each deinterleaver block 129a . . . 129n may receive input from a plurality of demapper blocks 126a . . . 126n with each deinterleaver block in the plurality 129a . . . 129n receiving input from a corresponding one of the plurality of demapper blocks 126a . . . 126n. Each depuncture block 131a . . . 131n may receive input from a plurality of deinterleaver blocks 129a . . . 129n with each depuncture block in the plurality 131a . . . 131n receiving input from a corresponding one of the plurality of deinterleaver blocks 129a . . . 129n. The output from each of the plurality of depuncture blocks 131a . . . 131n may be communicated to the Viterbi decoder block 132. The receive decoding control block 138 may enable control over the application of depuncture utilized in the receiver 101c.

In operation, the transmit coding control block 140 may enable control of puncture applied by each of the plurality of puncture blocks 105a . . . 105n individually, on a per-stream basis. The per-stream control of puncture may enable the coding rate to vary on a per-stream basis. The receive coding control block 138 may enable control of depuncture applied by each of the plurality of depuncture blocks 131a . . . 131n individually, on a per-stream basis. The per-stream control of depuncture may enable the receiver 101c to adapt to differences in the coding rate of the received signal on a per-stream basis.

Figure 2:
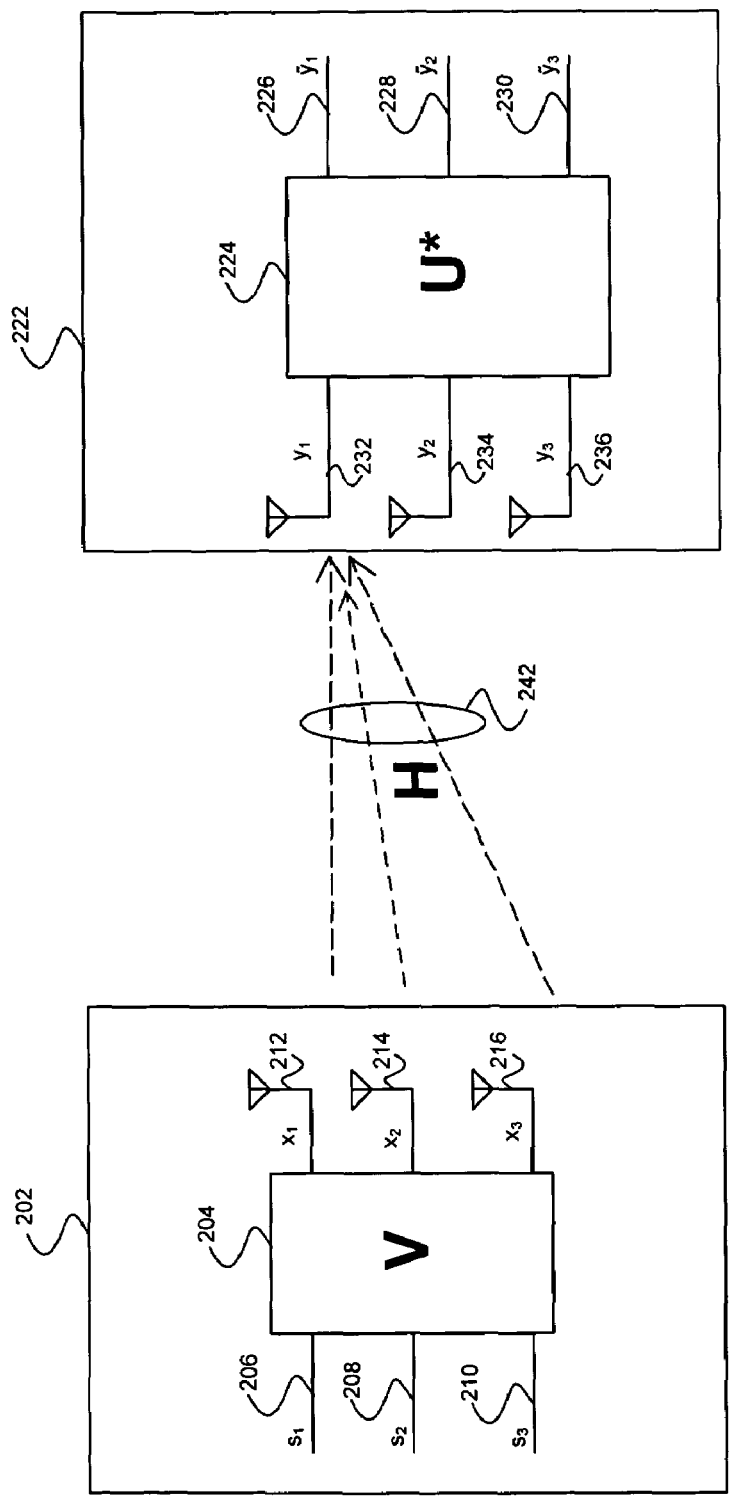
FIG. 2 is an exemplary diagram illustrating Eigen beamforming in accordance with an embodiment of the invention.

FIG. 2 is an exemplary diagram illustrating Eigen beamforming in accordance with an embodiment of the invention. Referring to FIG. 2 there is shown a transmitting mobile terminal 202, a receiving mobile terminal 222, and a plurality of RF channels 242. The transmitting mobile terminal 202 comprises a transmit filter coefficient block V 204, a first source signal $s_1$ 206, a second source signal $s_2$ 208, a third source signal $s_3$ 210, and a plurality of transmitting antenna 212, 214, and 216.

In operation, the transmitting antenna 212 may be adapted to transmit a signal $x_1$, the transmitting antenna 214 may transmit a signal $x_2$, and the transmitting antenna 216 may transmit a signal $x_3$. In beamforming each transmitted signal $x_1$, $x_2$, and $x_3$ may be a function of a weighted summation of at least one of the plurality of the source signals $s_1$, $s_2$, and $s_3$. The weights may be determined by the transmit filter coefficient block V such that: X=VS, where S may be represented by a 3×1 matrix $\{s_1, s_2, s_3\}$, and X may be represented by a 3×1 matrix $\{x_1, x_2, x_3\}$. The receiving mobile terminal 222 comprises a receive filter coefficient block U* 224, a first destination signal $\tilde{y}_1$ 226, a second destination signal $\tilde{y}_2$ 228, a third destination signal $\tilde{y}_3$ 230, and a plurality of receiving antenna 232, 234, and 236. The receiving antenna 232 may be adapted to receive a signal $y_1$, the receiving antenna 234 may receive a signal $y_2$, and the receiving antenna 236 may receive a signal $y_3$. The characteristics of the plurality of RF channels 242 utilized for communication between the transmitting mobile terminal 202, and the receiving mobile terminal 222 may be represented mathematically by a transfer coefficient matrix H.

The plurality of received signals $y_1$, $y_2$, $y_3$, may be expressed as a function of the plurality of transmitted signals $x_1$, $x_2$, $x_3$, and the transfer coefficient matrix H in the following equation:

$$Y=HX+N, \text{ where} \quad \text{equation[2]}$$

$Y=\{y_1, y_2, y_3\}$ may be represented as a 3×1 matrix; X may be represented as a 3×1 matrix $\{x_1, x_2, x_3\}$; H may be represented as a 3×3 matrix $\{\{h_{11}, h_{12}, H_{13}\}\{h_{21}, h_{22}, h_{23}\}\{h_{31}, h_{32}, h_{33}\}\}$; and N may be represented as is a 3×1 matrix $\{n_1, n_2, n_3\}$.

In this regard, N may represent random noise that exists in the communication medium between the transmitting station 202 and the receiving station 222.

Utilizing singular value decomposition (SVD), equation [2] may be represented in the following matrix equation form:

$$Y=UDV^*X+N, \text{ where} \quad \text{equation[3]}$$

U may be represented as a 3×3 orthonormal matrix whose Hermitian transpose U*, may be represented in the receive filter coefficient block 224; V* may be represented as a 3×3 orthonormal matrix that is the Hermitian transpose of V, which is represented in the transmit filter coefficient block 204; and D may be represented as a 3×3 diagonal matrix that comprises singular values of the transfer coefficient matrix H.

Accordingly, by substitution, $$Y=UDV^*VS+N, \text{ where} \quad \text{equation[4]}$$

$S=\{s_1, s_2, s_3\}$ may be a 3×1 matrix representation of the source signals $s_1$ 206, $s_2$ 208, and $s_3$ 210.

$$Y=UDS+N, \text{ since} \quad \text{equation[5]}$$

V*V=I by the unitary matrix property of V, where I represents the identity matrix.

$$U^*Y=U^*UDS+U^*N \quad \text{equation[6]}$$

$$\tilde{Y}=DS+U^*N, \text{ since} \quad \text{equation[7]}$$

$\tilde{Y}=U^*Y$, and $U^*U=I$ by the unitary matrix property of U. $\tilde{Y}$ may be represented as a 3×1 matrix $\{\tilde{y}_1, \tilde{y}_2, \tilde{y}_3\}$ which comprises a plurality of destination signals $\tilde{y}_1$ 226, $\tilde{y}_2$ 228, and $\tilde{y}_3$ 230 at the receiving station 222.

Although a singular value decomposition methodology is illustrated, the invention is not limited on this regard. Accordingly, other matrix decomposition methodologies may be utilized without departing from the various aspects of the invention. For example, QR decomposition, lower triangular, diagonal, upper triangular (LDU) decomposition, and Cholesky decomposition are other decompositions that may be utilized.

As is shown in equation [7], the destination signals 226, 228, and 230 may be proportional to the corresponding source signals 206, 208, and 210, plus a noise component. Equation [7] also illustrates an aspect of the beamforming method. As illustrated in FIG. 2, the receiving antenna 232 may receive signals from $s_1$, $s_2$, and $s_3$ as the corresponding transmitted signals $x_1$, $x_2$, and $x_3$ are each communicated via the communication medium between the transmitting station 202 and the receiving station 222. However, at the receiving antenna 232, the signals $s_2$, and $s_3$ may represent interference signals since the desired signal may be $s_1$. The orthonormal matrices V and U* may function as steering matrices by canceling contributions from signals $s_2$, and $s_3$ received at the receiving antenna 232. Similarly, at the receiving antenna 234, the signals $s_1$, and $s_3$ may represent interference signals since the desired signal may be $s_2$. The orthonormal matrices V and U* may function as steering matrices by canceling contributions from signals $s_1$, and $s_3$ received at the receiving antenna 234. At the receiving antenna 236, the signals $s_1$, and $s_2$ may represent interference signals since the desired signal may be $s_3$. The orthonormal matrices V and U* may function as steering matrices by canceling contributions from signals $s_1$, and $s_2$ received at the receiving antenna 236.

In general, a transmitting station 202 may comprise a plurality of M transmitted signals $x_1, \ldots, x_M$, and a plurality of M transmitting antenna. In such case, the transmit filter coefficient array V may be an M×M dimensionional array. In general a receiving station 222 may comprise a plurality of N received signals $y_1, \ldots, y_N$, and a plurality of N receiving antenna. In this case the receive filter coefficient array U* may be an N×N dimensional array. The diagonal matrix D may be an N×M dimensional array. In this regard, M may be greater than, less than, or equal to N. However, the number of information streams for $s_i$, L, may be limited to min(M,N).

Having derived the singular values in D, the value $d_{11}$ may be greater than that of $d_{22}$, which may be greater than that of $d_{33}$, and so forth with singular values decreasing monotonically in such manner with the potentially non-zero minimum value being $d_{ii}$, where i is equal to the smaller integer value among dimensions M and N. In operation, a transmitting station 202 may communicate information to a receiving station 222 by utilizing the plurality of source signals $s_1, \ldots, s_L$ and corresponding transmitted signals $x_1, \ldots, x_M$. An exemplary aspect of this mode of communication may be found in orthogonal frequency division multiplexing (OFDM) in which at least a portion of the total number of information bits are carried in at least one of the plurality of source signals $s_1, \ldots, s_L$.

Given information about the relative singular values in the matrix D, a number of key decisions may be made about the transmission mode in which the information may be communicated between the transmitting station 202, and the receiving station 222. In digital form, the information may be represented in a plurality of bits, b, which may be transmitted simultaneously between a transmitting station 202 and a receiving station 222. One decision related to transmission may comprise bit assignment, which may be utilized to determine how many bits, $b_j$, from among the plurality of bits, b, may be transmitted in an individual source signal $s_j$. Another decision may comprise the task of coding rate assignment, which may influence how the bits $b_j$ which may be coded in the source signal $s_j$ for transmission via an RF channel. One aspect of coding assignment may utilize, for example, binary convolutional coding (BCC). The invention is not limited to BCC: a plurality of coding techniques such as, for example, Turbo coding, or low density parity check (LDPC) coding may also be utilized. The rate at which information may be transmitted using BCC, which is also referred to as the coding rate, may be specified using the notion $i_b/t_b$, where $t_b$ represents the total number of bits which comprise a coding group of bits, while $i_b$ represents the number of information bits that are contained in the group of bits $t_b$. Any bits $t_b-i_b$ may represent redundant bits which may enable the receiving station 222 to detect and correct errors in transmitted bits from among the group of bits $i_b$ at the receiving station 222. Increasing the number of redundant bits may enable greater capabilities at the receiving station to detect and correct errors in information bits. The penalty for this additional error detection and correction capability may be a reduction in the information transfer rates between the transmitting station 202 and the receiving station 222.

The destination signal $\tilde{y}_i$ for RF channel i may be equal to $d_{ii}*s_i+\tilde{n}_i$ in which $s_i$ is the source signal $d_{ii}$ is the singular value from the matrix D for RF channel i, and $\tilde{n}_i$ is a noise component. The noise component, $\tilde{n}_i$, may be additive of the noise from all transmitted RF channels, in which:

$$\tilde{n}_i = u^*_{i1}\tilde{n}_1 + u^*_{i2}\tilde{n}_2 + \ldots + u^*_{im}\tilde{n}_m, \text{ where} \quad \text{equation [8]}$$

$u^*_{ij}$ is a weighting scale factor from the receive filter coefficient matrix U* for noise transmitted from the $j^{th}$ transmit antenna which is received at the $i^{th}$ receive antenna. Since U* is a unitary matrix, the noise variance of $\tilde{n}_i$ may be the same as that of $n_i$.

The ratio $(\tilde{y}_i/\tilde{n}_i)^2$ may define the signal a noise ratio (SNR) statistic for an RF channel i. Because $d_{11}$ may be greater than $d_{22}$, which may be greater than $d_{ii}$, where i is greater than 2, then a source signal $s_1$ which is associated with a first singular value $d_{ii}$, may produce a destination signal $\tilde{y}_1$ with the largest SNR, relative to other destination signals $\tilde{y}_i$. The destination signal $\tilde{y}_1$ may also be referred to as the first spatial mode. Since the first spatial mode may have the largest SNR, then the first spatial mode may be the spatial mode which is most reliably transmitted via the RF channel without error. As such, the destination signal $\tilde{y}_2$ may be referred to as the second spatial mode, and so forth. The SNR for the second spatial mode, $SNR_2$, may be lower than the SNR for the first spatial mode $SNR_1$.

In operation, a plurality of tones may be transmitted via an RF channel, where each tone may be transmitted at a frequency selected from a range of frequencies. The SNR in a given RF channel, i, may vary by a frequency such that a tone sent at frequency $f_1$ may have an $SNR_{f1}$ which is different from the SNR for a tone sent at a different frequency $f_2$, $SNR_{f2}$. An aggregate SNR may be determined for a spatial mode by computing a geometric mean SNR based upon the individual $SNR_{fi}$ from among the frequencies $f_i$ which may be transmitted via an RF channel. The aggregate geometric SNR, which may be referred to as $SNR_{geo}$, may be expressed as in the following equation:

$$SNR_{geo} = \sqrt[k]{\prod_{f_i=1}^{k} SNR_{f_i}}, \text{ where} \quad \text{equation [9]}$$

k may be equal to the number of tones which may be sent via an RF channel, $\Pi$ represents the multiplicative product of the SNRs for individual tones, and the expression in equation [9] may refer to the aggregate geometric SNR being equal to the $k^{th}$ root of the product individual SNRs from each of the k tones.

In accordance with an embodiment of the invention, a geometric SNR may be determined for each spatial mode $SNR_{geo,i}$, where the number of spatial modes may be equal to the lesser quantity among the M transmit antenna and the N receive antenna. Upon determining each of the $SNR_{geo,i}$, an algorithm such as, for example, the Aslanis formula may be used to determine a bit assignment among the spatial modes. For the $i^{th}$ spatial mode, the bit assignment, $b_i$, may be calculated by the Aslanis formula as in the following equation:

$$b_i = \log_2(1 + SNR_{geo,i}), \text{ where} \quad \text{equation [10]}$$

the expression in equation [10] computes a base 2 logarithm for the geometric SNR for spatial mode i.

A constraint associated with equation [10] is that the sum of $b_i$ across all spatial modes may equal the total number of information bits, b, which are being simultaneously transmitted from a transmitting station and received at a receiving station. Thus:

$$b = \sum_{i=1}^{i=\min(M,N)} b_i, \text{ where} \quad \text{equation [11]}$$

where min(M,N) represents a minimum value among M and N.

In operation, the bit assignment method may start with the assumption that bits are evenly distributed among the spatial modes. Then incremental bit assignment between a first spatial mode i and a second spatial mode j may be determined based upon the relative values of $SNR_{geo,i}$ and $SNR_{geo,j}$. An aspect of equation [10] is that a 6 decibel (dB) change in $SNR_{geo,i}$ may result in a 2 bit change in $b_i$. Thus, a 6 dB relative difference between $SNR_{geo,i}$ and $SNR_{geo,j}$ may result in the spatial mode with the larger SNR increasing its bit assignment by 1 bit while the spatial mode with the lesser SNR may decrease its bit assignment by 1 bit. Similarly, a 12 dB relative difference between $SNR_{geo,i}$ and $SNR_{geo,j}$ may result in the spatial mode with the larger SNR increasing its bit assignment by 2 bits while the spatial mode with the lower SNR may decrease its bit assignment by 2 bits. Each 6 dB increase in relative SNR between the two modes may result in the spatial mode with the larger SNR increasing its relative bit assignment by an additional bit while the spatial mode with the lesser SNR may decrease its bit assignment by an additional bit. The method may be extended to comparison between a plurality of spatial modes by sequentially comparing the spatial mode with the largest SNR to the spatial mode with the second largest SNR, then comparing the spatial mode with the second largest SNR to the spatial mode with the third largest SNR, and so forth.

Figure 3A:
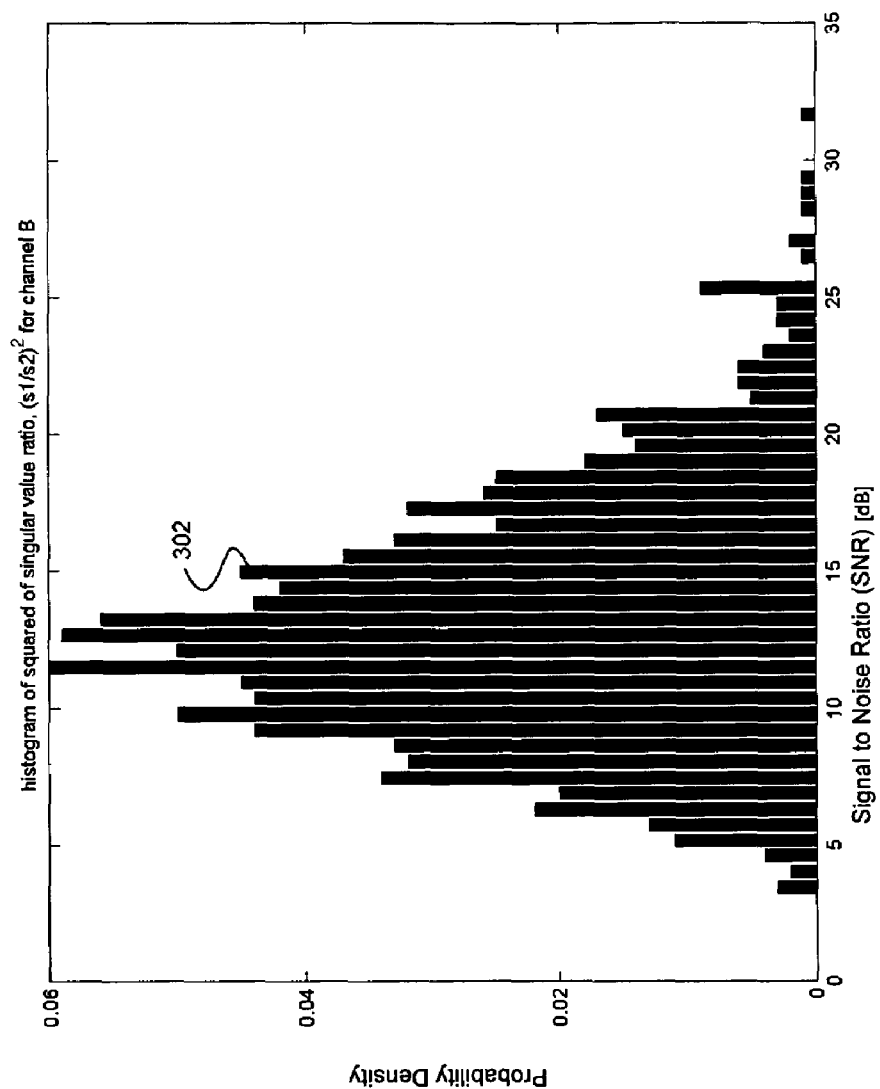
FIG. 3a is an exemplary histogram of probability density versus signal to noise ratio (SNR) for the square of singular value differences between the largest and the second largest singular values in the 2×2 system in RF channels of type channel B with rms delay spread of 15 ns as defined in IEEE 802.11n, in accordance with an embodiment of the invention.

FIG. 3a is an exemplary histogram of probability density versus signal to noise ratio (SNR) for the square of singular value differences between the largest and the second largest singular values in the 2×2 system in RF channels of type channel B with rms delay spread of 15 ns as defined in IEEE 802.11n, in accordance with an embodiment of the invention. Referring to FIG. 3a, there is shown a probability density function 302 in a histogram of probability density in the y-axis, versus the relative SNR for the first and second spatial modes in the x-axis. The channel is a channel B as defined in IEEE resolution 802.11n. The histogram of FIG. 3a may be based upon a series of observations of measured SNR for tones transmitted in a first spatial mode and in a second spatial mode of a type B channel.

Figure 3B:
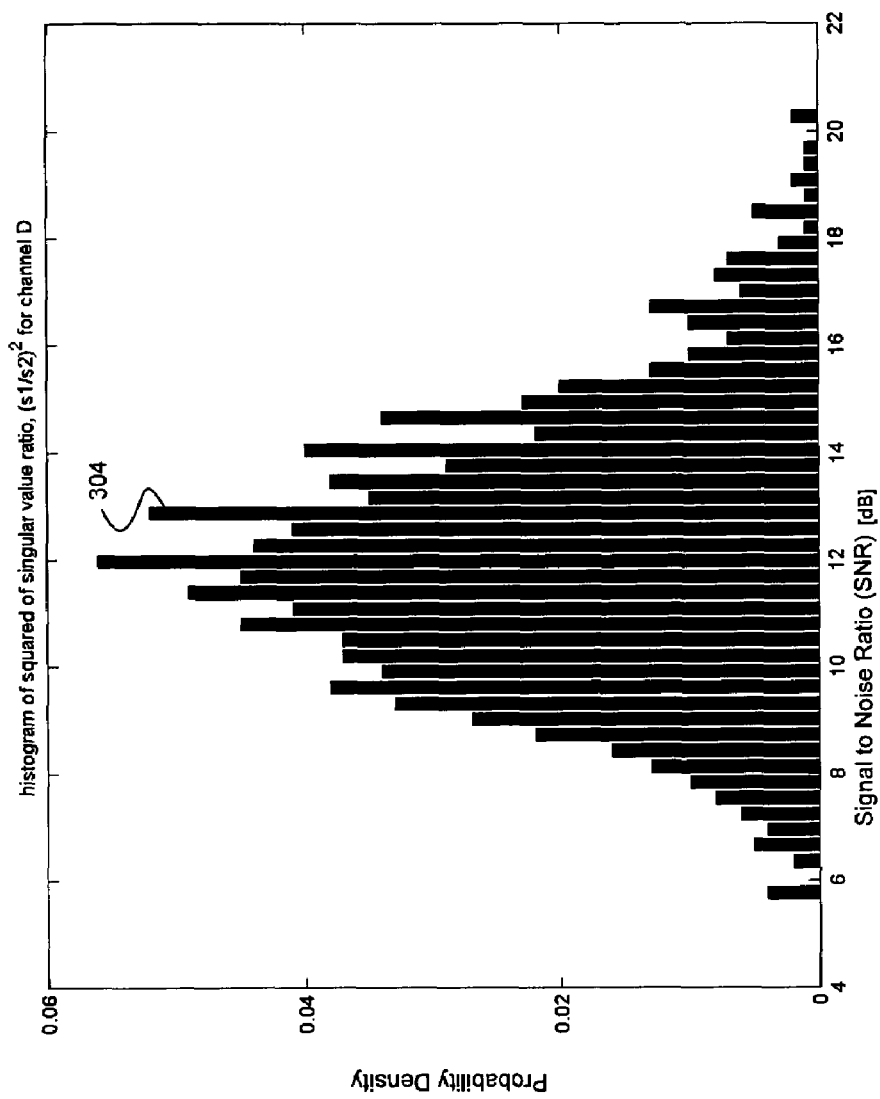
FIG. 3b is an exemplary histogram of probability density versus signal to noise ratio (SNR) for the square of singular value differences between the largest and the second largest singular values in the 2×2 system in RF channels of type channel D with rms delay spread of 50 ns as defined in IEEE 802.11n, in accordance with an embodiment of the invention.

FIG. 3b is an exemplary histogram of probability density versus signal to noise ratio (SNR) for the square of singular value differences between the largest and the second largest singular values in the 2×2 system in RF channels of type channel D with rms delay spread of 50 ns as defined in IEEE 802.11n, in accordance with an embodiment of the invention. Referring to FIG. 3b, there is shown a probability density function 304 in a histogram of probability density in the y-axis, versus the relative SNR for the first and second spatial modes in the x-axis. The channel is a channel D as defined in IEEE resolution 802.11n. The histogram of FIG. 3b may be based upon a series of observations of measured SNR for tones transmitted in a first spatial mode and in a second spatial mode of a type D channel. In comparison to FIG. 3a, there is a larger distribution in observed SNR differences between the first and second spatial modes in the B channel in FIG. 3b.

Figure 4:
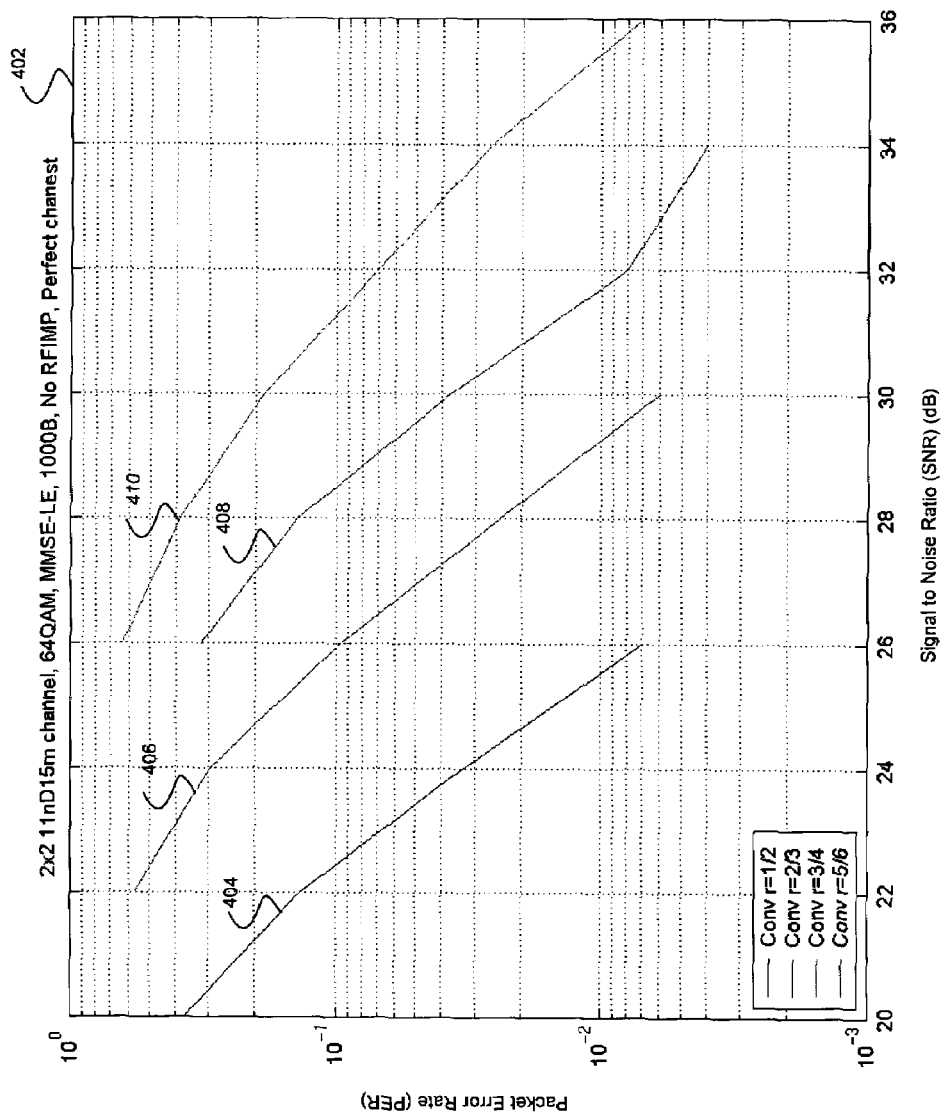
FIG. 4 is an exemplary diagram illustrating packet error rate (PER) versus SNR for various coding rates in binary convolutional coding (BCC), which may be utilized in connection with an embodiment of the invention.

FIG. 4 is a graph illustrating packet error rate (PER) versus SNR for various coding rates in binary convolutional coding (BCC), which may be utilized in connection with an embodiment of the invention. Referring to FIG. 4, there is shown graph 402 and a plurality of PER versus SNR plots 404, 406, 408, and 410. The graph 402 represents measurements associated with a 2×2 antenna array comprising 2 transmit antenna and 2 receive antenna, for an 802.11n type D channel, with a distance of about 15 meters between the transmitting antenna and the receiving antenna. In addition, the graph 402 is representative of 64 level quadrature amplitude modulation (64 QAM) RF signals, and minimum mean squared error with linear equalization (MMSE-LE). The length of packets transmitted in the data presented in graph 402 is about 1,000 bytes, with no RF impairments in the RF channel, and perfect channel estimation as represented in the transfer coefficient matrix, H.

The plot 404 illustrates a PER versus SNR performance using BCC with a coding rate of ½. The plot 406 illustrates a PER versus SNR performance using BCC with a coding rate of ⅔. The plot 408 illustrates a PER versus SNR performance using BCC with a coding rate of ¾. The plot 410 illustrates a PER versus SNR performance using BCC with a coding rate of ⅚. The SNR values shown in plots 404, 406, 408, and 410 may represent geometric mean SNRs which have been calculated for a single spatial mode.

Referring to FIG. 4 and choosing a PER, for example 0.1, or 10%, it may be seen that with each increase in redundancy in the coding rates, from ½, to ⅔, to ¾, to ⅚, the SNR at each corresponding PER level increases by approximately 3 dB. For example, a PER of 0.1, or 10%, using a coding rate of ½ may require an SNR of approximately 23 dB, but a PER of 0.1, or 10%, using a coding rate of ⅔ may require an SNR of approximately 26 dB.

In an exemplary embodiment of the invention, 2 singular modes may be utilized. In this regard, an information transfer rate of 72 megabits per second (Mbps) may be achieved utilizing:

$$72 \text{ Mbps} = 48(\text{tones/symbol/antenna}) * \frac{1}{4}(\text{symbol}/\mu\text{sec}) * 6(\text{bits/tone}) * \frac{1}{2}(\text{coding rate}) * 2(\text{antenna})$$

if the SNR and the bit assignment and coding rate assignment for the two spatial modes are the same.

If, however, the second spatial mode has an SNR which is 12 dB lower than the SNR for the spatial mode, the number of bits/tone in the first spatial mode may be increased by 2 bits while the number of bits/tone in the second spatial mode may be decreased by 2 bits with the same coding rate being utilized in both spatial modes. Thus, the following bit assignments and coding rate assignments may be utilized in the first and second spatial modes:

First spatial mode (antenna 1):
Bit assignment: 6 bits/tone
Coding rate assignment: ¾
Second spatial mode (antenna 2):
Bit assignment: 2 bits/tone
Coding rate assignment: ¾

This may allow an information transfer rate 72 Mbps to be maintained when there is a 12 dB difference in the SNR performance of the first spatial mode relative to that of the second spatial mode.

If the SNR performance of the second spatial mode is 9 dB lower than that of the first spatial mode reducing the bit assignment in the second spatial mode by 1 bit while increasing the bit assignment in the first spatial mode may compensate for 6 dB of the 9 dB difference. The remaining 3 dB of SNR may be compensated by using a coding rate in the second spatial mode which has more redundancy than that of the first spatial mode, namely:

First spatial mode (antenna 1):
Bit assignment: 6 bits/tone
Coding rate assignment: ⅔
Second spatial mode (antenna 2):
Bit assignment: 4 bits/tone
Coding rate assignment: ½ may allow a 72 Mbps information transfer rate to be maintained when there is a 9 dB difference in the SNR performance of the first spatial mode relative to that of the second spatial mode.

In another exemplary embodiment of the invention utilizing 2 spatial modes, an information transfer rate of 108 Mbps may be achieved utilizing:

$$108 \text{ Mbps} = 48(\text{tones/symbol/antenna}) * \frac{1}{4}(\text{symbol}/\mu\text{sec}) * 6(\text{bits/tone}) * \frac{3}{4}(\text{coding rate}) * 2(\text{antenna})$$

if the SNR and the bit assignment and coding rate assignment for the two spatial modes are the same.

If, however, the second spatial mode has an SNR which is 12 dB lower than the SNR for the spatial mode, the number of bits/tone in the first spatial mode may be increased by 2 bits while the number of bits/tone in the second spatial mode may be decreased by 2 bits with the same coding rate being utilized in both spatial modes. Thus, the following bit assignments and coding rate assignments may be utilized in the first and second spatial modes:

First spatial mode (antenna 1):
Bit assignment: 8 bits/tone
Coding rate assignment: ¾
Second spatial mode (antenna 2):
Bit assignment: 4 bits/tone
Coding rate assignment: ¾

This may allow an information transfer rate of about 108 Mbps to be maintained when there is a 12 dB difference in the SNR performance of the first spatial mode relative to that of the second spatial mode.

If the SNR performance of the second spatial mode is 6 dB lower than that of the first spatial mode, an alternative to changing the bit assignment among the spatial modes may utilize changing the coding rate assignment. For example, by assigning a coding rate in the second spatial mode which increases redundancy from the ¾ coding rate, and by assigning a coding rate in the first spatial mode which reduces redundancy from the ¾ coding rate:

First spatial mode (antenna 1):
Bit assignment: 6 bits/tone
Coding rate assignment: ⅚
Second spatial mode (antenna 2):
Bit assignment: 6 bits/tone
Coding rate assignment: ⅔ an information transfer rate of about 108 Mbps may be maintained.

In another exemplary embodiment of the invention, 3 singular modes may be utilized in which an information transfer rate of 144 Mbps may be achieved utilizing:

$$144 \text{ Mbps} = 48(\text{tones/symbol/antenna}) * \frac{1}{4}(\text{symbol}/\mu\text{sec}) * 6(\text{bits/tone}) * \frac{2}{3}(\text{coding rate}) * 3(\text{antenna})$$

if the SNR and the bit assignment and coding rate assignment for the three spatial modes are the same.

If there is no significant difference in the SNR performance of the first and second spatial modes, but there is a 6 dB reduction in the SNR performance of the third spatial mode relative to the second spatial mode, by utilizing the following bit assignments and coding rate assignments:

First spatial mode (antenna 1):
Bit assignment: 6 bits/tone
Coding rate assignment: ¾
Second spatial mode (antenna 2):
Bit assignment: 6 bits/tone
Coding rate assignment: ¾
Third spatial mode (antenna 3):
Bit assignment: 4 bits/tone
Coding rate assignment: ¾ an information transfer rate of about 144 Mbps may be maintained.

In another exemplary embodiment of the invention there may be a 9 dB reduction in the SNR performance of the second spatial mode relative to the first spatial mode, and a 9 dB reduction in the SNR performance of the third spatial mode relative to the second spatial mode. Increasing the bit assignment in the first spatial mode relative to the second spatial mode may compensate for 6 dB of the 9 dB difference in SNR performance between the two modes. Accordingly, decreasing redundancy in the coding rate from ⅔ to ¾ in the first spatial mode may compensate for the remaining 3 dB of SNR performance difference between the first spatial mode and the second spatial mode. In order to address the 9 dB difference in SNR performance between the second spatial mode and the third spatial mode, the bit allocation in the third spatial mode may be reduced by 2 bits relative to the second spatial mode. This may compensate for 6 dB of the SNR performance difference between the second spatial mode and the third spatial mode. By increasing redundancy in the coding rate from ⅔ to ½ in the third spatial mode, this may compensate for the remaining 3 dB of SNR performance difference between the second spatial mode and the third spatial mode. Thus, by utilizing the following bit assignments and coding rate assignments:

First spatial mode (antenna 1):
Bit assignment: 8 bits/tone
Coding rate assignment: ¾
Second spatial mode (antenna 2):
Bit assignment: 6 bits/tone
Coding rate assignment: ⅔
Third spatial mode (antenna 3):
Bit assignment: 4 bits/tone
Coding rate assignment: ½ an information transfer rate of about 144 Mbps may be maintained. In this example, the SNR performance difference between the first spatial mode and the third spatial mode was 18 dB.

In another exemplary embodiment of the invention, if there is a 3 dB difference in the SNR performance of the first spatial mode relative to the second spatial mode and there is no significant difference in the SNR performance of the second spatial mode relative to the first spatial mode, then the following bit assignments and coding rate assignments may be utilized:

First spatial mode (antenna 1):
Bit assignment: 8 bits/tone
Coding rate assignment: ½
Second spatial mode (antenna 2):
Bit assignment: 6 bits/tone
Coding rate assignment: ⅔
Third spatial mode (antenna 3):
Bit assignment: 6 bits/tone
Coding rate assignment: ⅔

In this regard, an information transfer rate of about 144 Mbps may be maintained. In this example, increasing the bit assignment to the first spatial mode by 2 bits relative to the second spatial mode may result in overcompensation because the bit assignment may require a 6 dB SNR performance difference. To compensate for an increase in the bit assignment to the first spatial mode, the redundancy is increased in the coding rate for the first spatial mode from ⅔ to ½. This coding rate assignment may compensate for the 3dB of overcompensation which may have resulted from the bit assignment.

The invention is not limited by the preceding examples, as for any example, a plurality of bit assignments and coding rate assignments may achieve similar results. The examples are, however, illustrative of an aspect of the invention which enables bit rate assignment and coding rate assignment decisions adapt the communication of information between a transmitting mobile station and a receiving mobile station in response to characteristics of RF channels.

In addition, the invention is not limited to systems comprising a plurality of spatial modes and/or to mobile terminals with a plurality of transmitting antenna and/or receiving antenna. For example, in single spatial mode and/or antenna systems, the SNR performance of a mobile terminal which transmits a single spatial mode may be compared to a reference SNR level with bit assignments and coding rate assignments being made based upon the SNR performance of the transmitting mobile terminal relative to the reference SNR level.

Furthermore, embodiments of the invention are not limited to systems comprising a single transmitting mobile station and a single receiving mobile station. Systems may comprise a plurality of transmitting mobile stations acting in concert to transmit information to a plurality of receiving mobile stations. For example, a transmitting mobile station may communicate information to a plurality of receiving mobile stations that form a multicast group of receiving mobile stations. In another aspect, a plurality of transmitting mobile stations may act in concert to transmit information to increase the effective transmitted power versus the transmitted power available to a single transmitting mobile station. Such a multiple transmitter system may offer a larger range over which information may be received by receiving mobile terminals and may provide superior SNR in comparison to a single transmitting mobile station.

Figure 5:
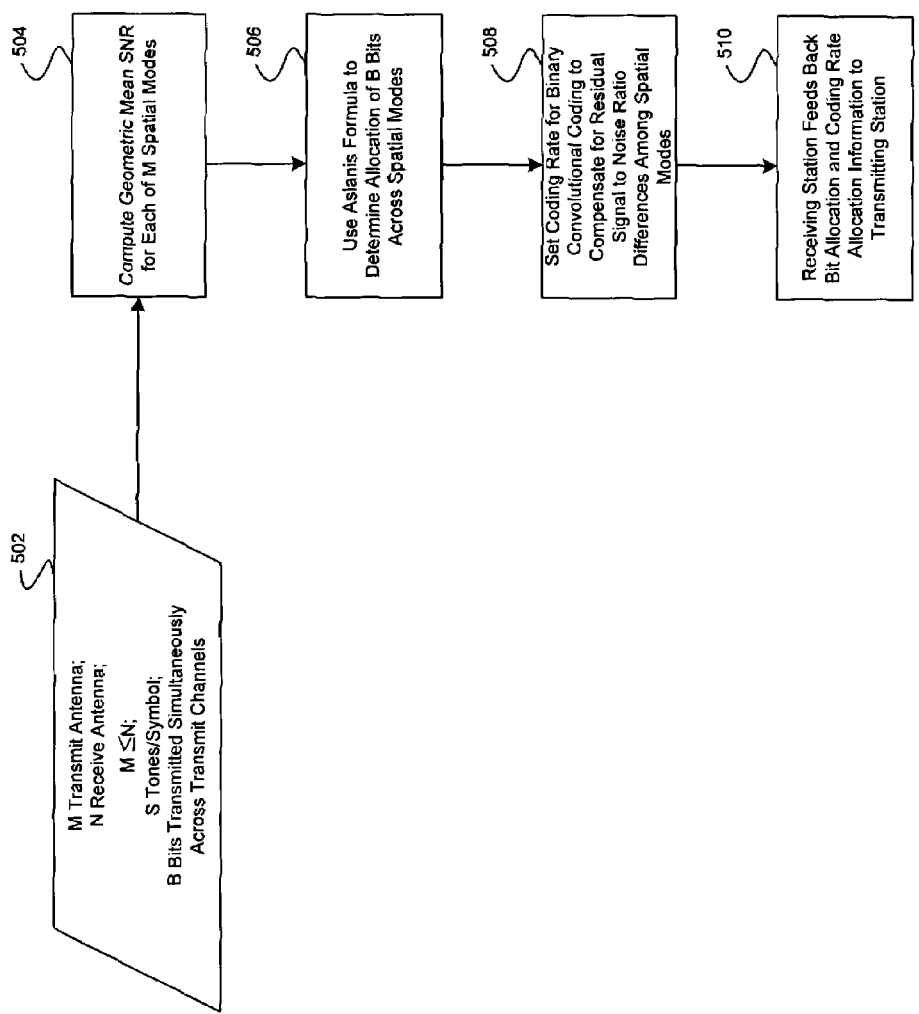
FIG. 5 is a flow chart illustrating exemplary steps for bit and coding rate assignment using Eigen beamforming in accordance with an embodiment of the invention.

FIG. 5 is a flow chart illustrating exemplary steps for bit and coding rate assignment using Eigen beamforming in accordance with an embodiment of the invention. Referring to FIG. 5 shows step 502, which establishes a set of parameters relevant to the operation of the bit assignment and coding rate assignment method. In step 502, it is assumed that N is greater than or equal to M, where M represents the number of transmitting antenna and N represents the number of receiving antenna. Furthermore, in step 502, B bits are transmitted simultaneously across the transmit channels. In step 504, a geometric mean SNR may be computed for each of M spatial modes. In step 506, the Aslanis formula, for example, may be utilized to determine assignment of B bits across the M spatial modes. In step 508, a coding rate may be set for binary convolutional coding to compensate for residual signal to noise differences among the M spatial modes. In step 510, the receiving station may feed back bit assignment and coding rate assignment information to the transmitting station.

In step 506 the initial assumption is that the B bits are distributed evenly among the M spatial modes. Accordingly, the Aslanis formula, for example, may be used to compute the SNRs for each of the spatial modes which are compared relative to one another with relative bit reassignments made based upon the relative SNR comparisons. If bit assignments do not compensate for the entire SNR difference between spatial modes, additional SNR compensation may be accomplished in step 508 through BCC coding rate assignments. In step 510, a closed loop channel feedback mechanism as specified in IEEE resolution 802.11n may be utilized.

Thus, for a two spatial mode case, for example, in light of SNR degradation in one spatial mode relative to the other, the invention enables the generation of information which allows modification in the transmission modes for the two spatial modes by increasing the information transfer rate in the spatial mode with the better SNR while simultaneously decreasing the relative information transfer rate in the spatial mode with the lesser SNR. The overall effect of the bit assignment and coding rate assignment decisions may result in higher overall information transfer rates between the transmitting station and the receiving station while minimizing PER.

Certain embodiments of the invention may be utilized in closed loop feedback mechanisms in defined in IEEE resolution 802.11n. Information pertaining to bit assignments and coding rate assignments may be included in information which is communicated by a receiving station back to a transmitting station when utilizing closed loop feedback methods. The bit assignment and coding rate assignments may be based upon channel estimations that may be computed at the receiving station and may be indicative of the characteristics of the RF channels as detected by the receiving station.

Embodiments of the invention are not limited to cases in which the receiving station determines bit assignments and coding rate assignments. In certain embodiments of the invention the transmitting station may determine bit assignments and coding rates based on feedback information from the receiving station. This feedback information may comprise, for example, channel estimate matrices computed by the receiving station.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communication system, the method comprising:
   concurrently transmitting, to a single receiving device, data via a plurality of RF channels utilizing a plurality of transmitting antennas;
   receiving feedback information related to said plurality of RF channels;
   assigning bits for transmission via said plurality of transmitting antennas based on said feedback information; and
   transmitting at least a portion of subsequent data having at least a first coding rate based on said assignment of bits via said at least one of said plurality of RF channels.

2. The method according to claim 1, comprising coding at least a portion of said assigned bits utilizing said first coding rate.

3. The method according to claim 1, comprising computing said first coding rate based on said received feedback information for transmitting said at least a portion of said subsequent data.

4. The method according to claim 1, wherein said received feedback information is based on channel estimation information for at least a portion of said plurality of RF channels.

5. The method according to claim 1, wherein said received feedback information is based on signal to noise ratio information for at least a portion of said plurality of RF channels.

6. The method according to claim 5, wherein said signal to noise ratio information is computed based on at least one transmitted tone for at least one of said plurality of RF channels.

7. The method according to claim 1, comprising computing at least a second coding rate based on said received feedback information for transmitting at least a remaining portion of said subsequent data.

8. The method according to claim 7, comprising coding at least a portion of said assigned bits utilizing said second coding rate.

9. The method according to claim 7, comprising transmitting said at least said remaining portion of said subsequent data having said at least said second coding rate via said at least one of said plurality of RF channels.

10. The method according to claim 1, comprising reassigning bits for transmission based on updated received feedback information related to said plurality of RF channels.

11. A method for communicating information in a communication system, the method comprising:
    concurrently receiving, from a single transmitting device, data via a plurality of RF channels utilizing a plurality of receiving antennas; and
    transmitting feedback information related to said plurality of RF channels, wherein:
    said transmitted feedback information is utilized to assign bits for transmission via at least one of said plurality of RF channels; and
    at least a portion of subsequent data having at least a first coding rate is transmitted based on said assignment of bits via said at least one of said plurality of RF channels.

12. The method according to claim 11, wherein at least a portion of said assigned bits is coded utilizing said first coding rate.

13. The method according to claim 11, wherein said first coding rate is computed based on said transmitted feedback information for transmitting said at least a portion of said subsequent data.

14. The method according to claim 11, wherein said transmitted feedback information is based on channel estimation information for at least a portion of said plurality of RF channels.

15. The method according to claim 11, wherein said transmitted feedback information is based on signal to noise ratio information for at least a portion of said plurality of RF channels.

16. The method according to claim 15, wherein said signal to noise ratio information is computed based on at least one transmitted tone for at least one of said plurality of RF channels.

17. The method according to claim 11, wherein at least a second coding rate is computed based on said transmitted feedback information and utilized for transmitting at least a remaining portion of said subsequent data.

18. The method according to claim 17, wherein at least a portion of said assigned bits is coded utilizing said second coding rate.

19. The method according to claim 17, comprising receiving said at least said remaining portion of said subsequent data having said at least said second coding rate via said at least one of said plurality of RF channels.

20. The method according to claim 11, wherein bits for transmission are reassigned based on updated transmitted feedback information related to said plurality of RF channels.

21. A system for communicating information in a communication system, the system comprising:
a transmitter that is operable to concurrently transmit, to a single receiving device, data via a plurality of RF channels utilizing a plurality of transmitting antennas;
said transmitter is operable to receive feedback information related to said plurality of RF channels;
said transmitter is operable to assign bits for transmission via said plurality of transmitting antennas based on said feedback information; and
said transmitter is operable to transmit at least a portion of subsequent data having at least a first coding rate based on said assignment of bits via said at least one of said plurality of RF channels.

22. The system according to claim 21, comprising a processor that is operable to code at least a portion of said assigned bits utilizing said first coding rate in said transmitter.

23. The system according to claim 21, comprising a processor is operable to compute said first coding rate in said transmitter based on said received feedback information for transmitting said at least a portion of said subsequent data.

24. The system according to claim 21, wherein said received feedback information is based on channel estimation information for at least a portion of said plurality of RF channels.

25. The system according to claim 21, wherein said received feedback information is based on signal to noise ratio information for at least a portion of said plurality of RF channels.

26. The system according to claim 25, wherein said signal to noise ratio information is computed based on at least one transmitted tone for at least one of said plurality of RF channels.

27. The system according to claim 21, comprising a processor is operable to compute at least a second coding rate in said transmitter based on said received feedback information for transmitting at least a remaining portion of said subsequent data.

28. The system according to claim 27, wherein said processor is operable to code at least a portion of said assigned bits utilizing said second coding rate in said transmitter.

29. The system according to claim 27, wherein said transmitter is operable to transmit said at least said remaining portion of said subsequent data having said at least said second coding rate via said at least one of said plurality of RF channels.

30. The system according to claim 21, wherein said transmitter is operable to reassign bits for transmission based on updated received feedback information related to said plurality of RF channels.

* * * * *

UNITED STATES PATENT AND TRADEMARK OFFICE
CERTIFICATE OF CORRECTION

PATENT NO. : 7,616,955 B2  Page 1 of 1
APPLICATION NO. : 11/052389
DATED : November 10, 2009
INVENTOR(S) : Joonsuk Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Nineteenth Day of October, 2010

David J. Kappos
*Director of the United States Patent and Trademark Office*